Nov. 20, 1962 A. STRAUB 3,064,521
MOTION PICTURE PROJECTOR CHANGE-OVER SHUTTER
Filed Sept. 28, 1959

United States Patent Office 3,064,521
Patented Nov. 20, 1962

3,064,521
MOTION PICTURE PROJECTOR CHANGE-OVER SHUTTER
Albert Straub, Stuttgart-Bad Cannstatt, Germany, assignor to Eugen Bauer GmbH, Stuttgart-Unterturkheim, Germany
Filed Sept. 28, 1959, Ser. No. 842,638
Claims priority, application Germany Sept. 27, 1958
4 Claims. (Cl. 88—17)

The present invention relates to motion picture projectors, and in particular the present invention relates to the light flap structure which is used with professional motion picture projectors.

As is well known, it is customary to use a pair of motion picture projectors alternately and when one projector is used the light flaps thereof are moved to an open position while the light flaps of the projector which has just been used are moved to a closed position. It is conventional to actuate the light flaps electromagnetically, and the armature of the electromagnet moves along a straight line with such a speed that the parts which are actuated thereby for the purpose of moving the light flaps are subjected to severe stresses. Thus, the armature very rapidly accelerates to its maximum speed and remains at this maximum speed until just before the end of the stroke of the armature and then it very rapidly decelerates, and as a result the structure which is actuated by the moving armature is very suddenly moved from its rest position and very suddenly stopped. As a result, the parts move with unavoidable and highly undesirable noise and in addition it is essential to connect to the structure a suitable damping device which will damp the movement of the parts. Of course, these damping devices provide a certain resistance to the movement of the parts and it is therefore necessary to move the parts with an energy great enough not only to move the parts themselves but also to overcome the resistance provided by the damping devices, and as a result it is essential to use a relatively large amount of energy when moving the light flaps between their closed and open positions.

One of the objects of the present invention is to overcome the above drawbacks by providing a light flap moving structure which will operate very smoothly and which will because of its own design gradually come to a stop as well as start to move gradually so that it is absolutely unnecessary to include with the structure of the invention any devices for damping the movement of the parts.

It is also an object of the present invention to provide a structure of the above type which requires very little energy and which in fact requires far less energy for the movement of its parts than is required by the corresponding conventional structure.

A further object of the present invention is to provide in a device of the above type motion transmitting structure composed of a relatively small number of smoothly operating parts which are very easy to move and which at the same time operate very reliably to locate the light flaps in their open and closed positions.

With the above objects in view the present invention includes in a motion picture projector a light flap which is movable between a closed position extending across the optical axis and an open position spaced from the optical axis. In accordance with the present invention, a moving means is provided to move the light flap between its positions, and this moving means gradually increases its speed of movement during the initial phase of movement of the light flap from one to the other of its positions and the speed of movement of the moving means gradually diminishes to zero during the final phase of movement of the light flap from one to the other of its positions, so that with this structure of the invention it is unnecessary to use any damping devices of any type. With the moving means of the invention, the speed of movement of the parts preferably follows a sine curve from one crest to the next crest thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
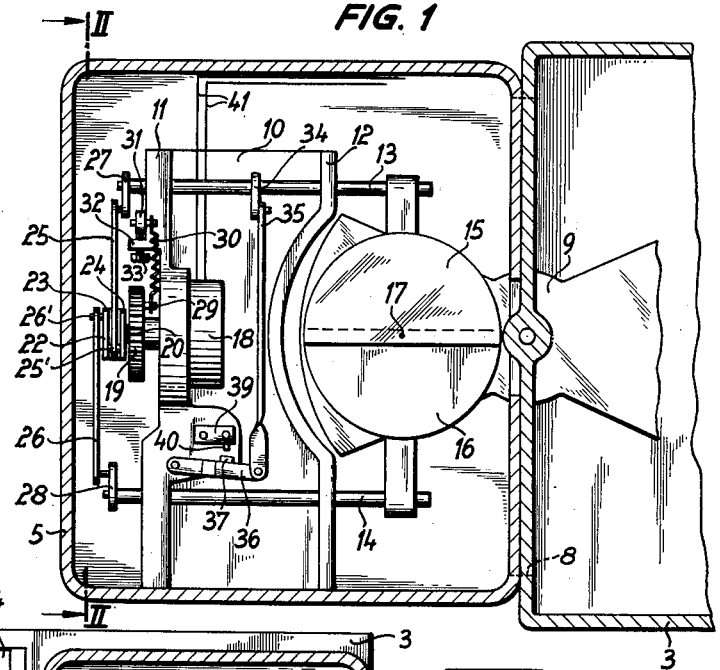
FIG. 1 is a sectional elevation showing the light flap structure of a motion picture projector as well as the structure for moving the light flaps, the section of FIG. 1 being taken in a plane normal to the optical axis.
Figure 2:
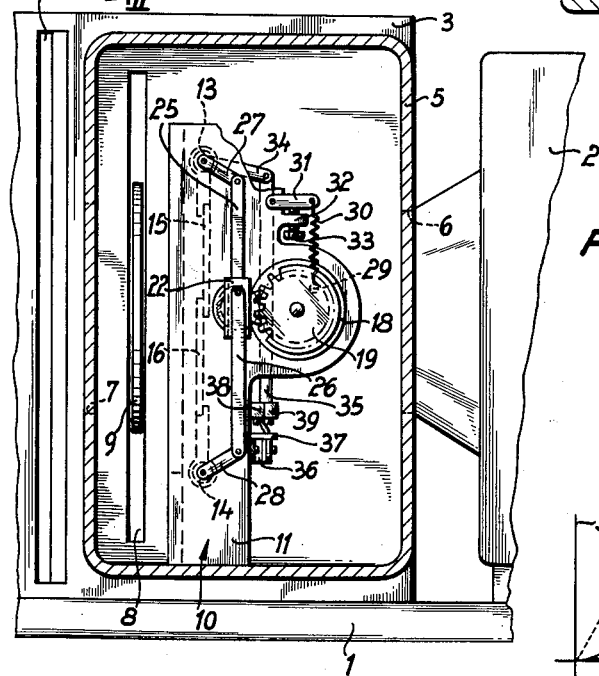
FIG. 2 is an end view of the structure of FIG. 1 as seen from the left of FIG. 1 with the left wall of the housing shown in FIG. 1 removed so as to clearly show the structure to the right of this left wall of FIG 1.

Referring to FIG. 2, there is fragmentarily shown therein a table 1 on which the projector is supported. This projector includes a lamp housing 2 within which a suitable conventional lamp structure is located, and in front of the lamp housing 2 is located a housing 3 which houses the operating mechanism of the projector. This housing 3 serves to house the structure which advances the film which is being projected. FIG. 2 shows at the left portion thereof the film guide 4 which guides the film during the projection, and the structure within the housing 3 operates to advance the film in a stepwise fashion along the guide 4. The housing 3 carries a housing 5 which is positioned between the film guide 4 and the lamp housing 2, and this housing 5 accommodates part of the the rotary shutter as well as the light flaps and the structure which operates the light flaps. The housing 5 has its end walls formed with the aligned openings 6 and 7 (FIG. 2) through which the light passes to the film in order to project the desired image onto the screen, the light advancing to the left from the lamp housing 2 of FIG. 2 toward the film guide 4 of FIG. 2 through the openings 6 and 7. The shutter 9 which is rotatably supported and driven in a known way by structure carried in the housing 3 extends at a portion thereof through a slot 8 of the housing 5 into the interior of the latter, as is particularly evident from FIGS. 1 and 2.

Within the housing 5 is located a support means formed by a vertically extending substantially channel-shaped member 10. This member 10 has a pair of side flanges 11 and 12 formed with a pair of aligned upper openings through which a shaft 13 extends so that the shaft 13 is rotatably supported by the flanges 11 and 12 of the support means 10, and in a similar manner the flanges 11 and 12 are formed with a pair of aligned openings through which a lower shaft 14 extends so that the shaft 14 is also turnably supported by the support means 10, and these shafts 13 and 14 are parallel to each other and located on opposite sides of the optical axis indicated at 17 in FIG. 1. Moreover, it will be noted that the shafts 13 and 14 extend perpendicularly with respect to the optical axis. Of course, the light from the lamp housing 2 extends along the optical axis 17. In the example illustrated in the drawings, a pair of light flaps 15 and 16 are respectively fixed to the shafts 13 and 14 at the end portions of the latter which are adjacent to the housing 3, these light flaps 15 and 16 being shown in the drawings in their closed position where they engage and overlap each other and where they are substantially located in a plane which is normal to the optical axis 17. These flaps 15 and 16 are turnable away from each other to an open position spaced from the optical axis when the projection is made. As is apparent from FIGS. 1 and 2, each of the flaps 15 and 16 extends through somewhat more than a semi-circle and these flaps overlap each other at their portions which are located at the elevation of the optical axis.

The flange 11 of the support means 10 carries an electromagnet 18 which has a rotary armature, and the rotary armature of the electromagnet 18 is fixed to a gear 19 which turns with the armature of the electromagnet. The gear 19 meshes with a pinion 21 which is carried by a shaft 20 which is turnably carried by the flange 11 of the support means 10, and it will be noted that the common turning axis of gear 19 and the armature of the electromagnet 18 as well as the axis of the shaft 20 are parallel to the shafts 13 and 14. The shaft 20 which carries the pinion 21 is fixed at its left end, as viewed in FIG. 1, to a rotary member in the form of an elongated channel member 22 having a pair of side flanges 23 and 24.

A link 25 is pivotally connected at its lower end, as viewed in FIGS. 1 and 2, to the lower end portion of the channel member 22, through the medium of a pivot pin 25' which extends between and is carried by the side walls 23 and 24 of the rotary channel member 22, and it will be noted that the link 25 extends into the space between the side walls 23 and 24. A second link 26 is pivotally connected at its upper end, as viewed in FIGS. 1 and 2, to the wall 23 adjacent the upper end of the latter through the medium of the pivot pin 26', and it will be seen that the link 26 is located at the exterior of the rotary member 22. The link 25 is pivotally connected at its end distant from the rotary member 22 to the free end of a lever 27 which is fixed to and extends radially from the shaft 13, and in a similar manner the link 26 is pivotally connected at its end which is distant from the rotary member 22 to a lever 28 which is fixed to and extends radially from the shaft 14. Thus, the levers 27 and 28 together with the shafts 13 and 14, respectively fixed thereto form a pair of lever means respectively connected to the pair of flaps 15 and 16 for turning the latter between their open and closed positions, and the pairs of links 25 and 26 are respectively connected to the levers to turn the latter upon rotation of the rotary member 22 in a manner described below.

A spring means is operatively connected to the armature of the electromagnet 18 for returning this armature to a predetermined rest position when the solenoid 18 is unenergized, and this spring means takes the form of the spring 30 which is connected at its lower end, as viewed in FIGS. 1 and 2, to the gear 19 and at its upper ends is connected to a lever 31 turnably carried by the flange 11 of the support means 10. This flange 11 is provided with a projection 32 (FIG. 2) which is threadedly bored and threadedly carries a screw 33 the top end of which bears against the underside of the lever 31, so that by turning the screw 33 it is possible to adjust the force of the spring 30, and thus the screw 33 together with the projection 32 forms an adjusting means for adjusting the tension of the spring means 30. Between the flanges 11 and 12 of the support means 10, the shaft 13 fixedly carries a curved lever 34 which is pivotally connected to one end of a link 35 whose opposite end is connected to a lever 36 which is curved intermediate its ends so that the ends of the lever 36 are offset one with respect to the other. This lever 36 is pivotally carried by a portion of the flange 11. At its upper side the lever 36 carries a projection 37 which is fixed to the lever 36 for movement therewith and which forms a switch actuating member, this projection 37 being in the form of a plate which extends substantially horizontally. The flange 11 carries over the projection or plate 37 a pair of switches 38 and 39 which are respectively provided with actuating pins 40, and the arrangement is such that when the flaps move to their open position, the shaft 13 turns in a counterclockwise direction, as viewed in FIG. 2, so as to raise the lever 36 and cause the plate 37 to close the switches 38 and 39 which can be connected to any suitable devices which will be automatically set into operation when the flaps move to their open position. Of course, in the same way the switches 38 and 39 will be opened automatically when the flaps 15 and 16 return to their closed position shown in FIGS. 1 and 2, so that the electrical devices which are set into operation upon closing of the switches 38 and 39 will automatically stop operating when the flaps 15 and 16 return to their closed position shown in FIGS. 1 and 2.

The structure is illustrated in FIGS. 1 and 2 in its rest position where the light flaps 15 and 16 are in their closed position extending across the optical axis. It will be noted that in this position of the parts the links 25 and 26 extend along a straight line which passes through the axes of the pivot pins 25' and 26'. In the event that it is desired to start the operation of the projector, then a suitable switch is closed so as to energize the rotary electromagnet 18 through the leads 41 (FIG. 1). This can take place, for example, by actuating a known switch on the other projector which is operating while the projector illustrated in the drawings is idle.

The magnet 18 upon becoming energized pulls its armature angularly toward a given position, and the turning armature through its connection with the gear 19 turns the latter, and the stroke of the armature and gear 19 is of a precisely determined angle. The transmission ratio between the gear 19 and the pinion 21 is such that this pinion turns through exactly 180° during the movement of the armature of the electromagnet through its stroke upon energizing of the electromagnet. As is apparent from the drawings, during the initial phase of the turning of the pinion 21, the rotary member 22 will turn therewith and at the very beginning the pivot pins 25' and 26' will have entirely horizontal components of movement and while, due to the rotation of the member 22 and the pins 25' and 26' therewith, the vertical components of movement of the pivot pins 25' and 26' are continuously increasing, at the very beginning of the turning movement of the rotary member 22, since it is in a vertical position when at rest, the vertical components of movement of the pivot pins are extremely small and the movement of the pivot pins during the initial phase is almost entirely horizontal. Therefore, during this initial phase of turning movement of the rotary member 22 there will be practically no speed of movement of the links 25 and 26 longitudinally. Of course, the vertical components of movement gradually increase and become a maximum when the rotary member 22 has turned through 90° and extends horiontally, and of course at this instant there is no horizontal component, so that by the time the rotary member 22 has turned through 90° the vertical movement of the links 25 and 26 which initially was zero has now reached a maximum, and of course during the second half of the movement of the rotary member 22 the speed of movement of the parts gradually diminishes until it again reaches zero when the member 22 has reached the end of its 180° of turning. The links 25 and 26 move at their maximum speed when the rotary member 22 has turned through 90°. At the end of the turning of the rotary member 22 the axes of the pivot pins 25' and 26' have interchanged their positions, as compared to the rest position of the parts shown in FIGS. 1 and 2, and at this time the links 25 and 26 are also located along the same straight line which interconnects the axes of the pivot pins 25' and 26'.

Figure 3:
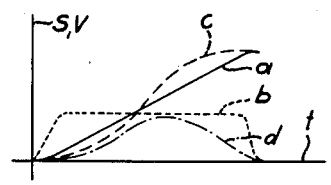
FIG. 3 graphically represents the manner in which the parts operate.

The manner in which the parts operate is graphically illustrated in FIG. 3 where the horizontal ordinate represents time $t$, while the vertical ordinate represents both distance $s$ and speed $v$.

The curve $a$ of FIG. 3 shows the distance through which the armature of the electromagnet turns, and it is evident that the angular distance through which the armature turns gradually increases according to a straight line, as indicated by the curve $a$. The curve $b$ represents the speed of movement of the armature, and it is clear from FIG. 3 that the armature very quickly accelerates to its maximum speed, remains at this maximum speed until almost the end of the stroke of the armature is reached and then the speed rapidly drops off, as is clearly indicated by the curve $b$ in FIG. 3. Of course, the curves $a$ and $b$ of FIG. 3 are applicable equally to the gear 19 which turns with the armature of the rotary electromagnet.

It is clear, therefore, that the armature and the gear 19 are strongly accelerated and decelerated. However, in spite of this fact, with the structure of the invention the links 25 and 26 and thus the shafts 13 and 14 and the flaps 15 and 16 therewith move according to the curve $c$ illustrated in FIG. 3, this curve $c$ representing the angular distance through which these parts turn during each stroke. It will be seen that the curve $c$ is in fact a sine curve from the lower crest to an upper crest thereof. Moreover, the curve $d$ which illustrates the speed of movement of the links 25 and 26, and the shafts 13 and 14 and the flaps 15 and 16 therewith, shows that initially the speed of movement is very low during the initial phase of movement of the parts and then gradually increases to a maximum and finally decreases gradually to a minimum becoming zero at the end of the movement. The acceleration of all of these parts which are connected directly with and directly influence the movement of the flaps 15 and 16 is therefore maintained within moderate limits and there are no sudden jolts or the like which subject the parts undesirably to large stresses.

Because of the above described operation the flaps 15 and 16 noiselessly reach their open position and provide a free path of movement of the light along the optical axis 17. Of course, during this movement of the flaps 15 and 16 to their open position the spring 30 has been tensioned. The projector is now capable of projecting an image onto the screen. Of course, simultaneously with the movement of the flap 15 upwardly to its open position, the lever 36 has been turned upwardly so that the projection 37 thereof has closed the switches 38 and 39 by actuation of the buttons 40 thereof.

When the other projector is to start its operation and the operation of the projector shown in the drawing is to stop, then the light flaps of this other projector are opened. Simultaneously the switch which controls the circuit through the leads 41 to the electromagnet 18 is opened, so that the electromagnet 18 is unenergized and now the spring 30 automatically returns the parts to their rest position illustrated in FIGS. 1 and 2, and it will be noted that during the return of the flaps 15 and 16 to their closed position shown in FIGS. 1 and 2 the parts also move in the above-described manner so that their speed gradually increases to a maximum at the middle of the cycle of movement of the parts and then gradually diminishes to automatically become zero at the end of the movement of the parts. Thus, in this case also the movement is substantially sinusoidal and there are no jolts when the parts start or stop. Of course, during the return of the flaps to their closed position the lever 36 turns downwardly so that the plate 37 moves away from the switches 38 and 39 which automatically open.

It is apparent from the above description that the electromagnet 18 together with the gears 19 and 21 and the rotary member 22 as well as the links 25 and 26, the levers 27 and 28 and the shafts 13 and 14 form a moving means which moves the flaps 15 and 16 between their open and closed positions in such a manner that during the initial phase of the movement the speed of movement of the parts increases only gradually and then during the final phase of movement the speed of movement of the parts decreases also gradually until the parts finally come to a stop, and thus with this construction there is no necessity for any damping devices or the like and the energy requirements are very low since it is unnecessary to overcome the resistance of such damping devices or the like. The rotary member 22 together with the links 25 and 26 and the levers 27 and 28 which form a lever means with the shafts 13 and 14, respectively, form a transmission between the magnetic means 18, 19 and the flaps 15 and 16 for moving the latter according to a sine curve as pointed out above.

In order to guarantee the best possible cooperation of the two projectors, it is essential that the flaps 15, 16 of one projector reach their closed position precisely at the moment when the flaps of the other projector are opened. Inasmuch as the speed with which the flaps move to their closed position is determined by the tension of the spring 30, it is possible by moving the screw member 33 of the tension adjusting means to accurately regulate the tension of the spring 30 so that the moment when the flaps reach their closed position can be very precisely set and in this way the cooperation of the pair of projectors can be very closely correlated.

Of course, instead of a pair of switches 38 and 39 connected to any suitable electrical devices which are to be set into operation automatically with the opening of the flaps, it is possible to provide any number of switches, and furthermore it is possible to provide the switch operating plate 37 with such a configuration that the series of switches can be closed in any desired sequence.

It will be noted that with the above-described structure of the invention not only is the necessity for damping devices or the like eliminated so that the amount of energy required to move the structure of the invention is extremely low, but in addition the stresses to which the structure is subjected is also very low so that the structure of the invention is not subjected to any great wear and will have a long life of reliable operation.

It will be understood that each of the elements described above, or two or more together, may also find a useful application in other types of projectors differing from the types described above.

While the invention has been illustrated and described as embodied in light flaps for motion picture projectors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture projector, in combination, a pair of light flaps turnable toward and into engagement with each other to a closed position where said flaps are located substantially in a plane normal to the optical axis and said flaps being turnable away from each other to an open position where said flaps are spaced from the optical axis; a pair of lever means respectively connected to said flaps for turning the latter between said positions; a pair of links respectively connected at one end to said pair of lever means; rotary means to which the links are pivotally connected at their opposite ends, said rotary means moving said links respectively in opposite directions during turning of said rotary means; and electromagnetic means operatively connected to said rotary means for turning the same, said electromagnetic means remaining stationary in a rest position when unenergized and in an operative position when energized and having between said positions a stroke which turns said rotary means through an angle of 180° to produce an interchange between the position of the pivotal connections between said links and rotary means during movement of said flaps from one to the other of said positions thereof, whereby the speed of movement of said pivotal connections between said links and rotary means varies sinusoidally to provide substantially shock-free, gradual starting and stopping of said latter pivotal connections.

2. In a motion picture projector, in combination, a pair of flaps respectively turnable about parallel axes toward each other to a closed position located substantially in a plane extending normal to the optical axis and to an open position where both of said flaps are spaced from said optical axis; a pair of lever means respectively connected operatively with said flaps for turning the same respectively around said axes between said positions; a pair of links respectively pivotally connected at one end to said pair of lever means; an elongated rotary channel member having a pair of side walls between which one of said links extends, said one link being pivotally connected to said channel member, and the other of said links also being pivotally connected to said channel member at the exterior of the latter to one of the side flanges thereof; and electromagnetic means operatively connected to the other of the side flanges of said rotary member for rotating the latter to move said flaps between said positions thereof, said electromagnetic means remaining stationary when unenergized and remaining stationary when energized after moving through a predetermined stroke, and said electromagnetic means while moving through said stroke turning said rotary member through approximately 180°.

3. In a motion picture projector, in combination, a light flap having a closed position extending across the optical axis and an open position spaced from the optical axis; and moving means operatively connected to said flap for moving the same between said positions thereof with a speed which gradually increases during the starting of the movement of the flap and which gradually diminishes to zero when the flap approaches the position to which it is being moved, said moving means including a rotary electromagnet having a rotatable armature, a gear fixed to said armature to turn therewith, and a pinion meshing with said gear, the armature and said gear turning together, when the electromagnet is energized, through an angle which turns said pinion through 180°, said pinion being connected with said flap through a transmission forming part of said moving means and including a linkage and said electromagnet when energized remaining stationary after turning said pinion through 180°.

4. In a motion picture projector, in combination, support means; a pair of parallel shafts rotatably carried by said support means and respectively having their axes extending perpendicularly to and located on opposite sides of the optical axis; a pair of flaps respectively fixed to said shafts for turning movement therewith; a pair of levers respectively fixed to and extending radially from said shafts; a pair of links respectively pivotally connected to said levers; rotary means pivotally connected to said links distant from said levers for acting through said links on said levers to turn the latter and said flaps therewith, respectively; and electromagnetic means cooperating with said rotary means for actuating the same, said electromagnetic means remaining stationary in a rest position when unenergized and remaining stationary in an operative position when energized and moving between said positions through a stroke which turns said rotary means through approximately 180°.

References Cited in the file of this patent

UNITED STATES PATENTS

| 1,068,208 | Bingham | July 22, 1913 |
| 1,188,074 | Hochstetter | June 20, 1916 |
| 1,771,591 | Strong | July 29, 1930 |
| 1,881,904 | Owens | Oct. 11, 1932 |
| 1,888,276 | Loehr et al. | Nov. 22, 1932 |
| 2,494,187 | Mannon | Jan. 10, 1950 |

FOREIGN PATENTS

| 628,637 | France | Oct. 26, 1927 |